FIG. 1

INVENTOR.
ARTHUR E. CHAMBERS
BY
WILSON, SETTLE & CRAIG
ATTORNEYS

United States Patent Office 3,109,550
Patented Nov. 5, 1963

3,109,550
METHOD AND APPARATUS FOR ASSEMBLING
AND FASTENING LAMINATIONS
Arthur E. Chambers, 21370 Knudsen, Grosse Ile, Mich.
Filed Sept. 29, 1961, Ser. No. 141,772
24 Claims. (Cl. 218—29)

The present invention relates to a method of and apparatus for making laminated riveted assemblies and more particularly to an apparatus and a method of stacking, segregating and assembling laminated articles such as electric motor stator assemblies.

This application discloses an improvement upon the invention disclosed and claimed in my earlier filed, copending application, Serial No. 772,049, filed in the United States Patent Office on November 5, 1958, now Patent No. 3,044,652 issued July 17, 1962.

In my above-identified earlier application, I disclosed a method of and apparatus for assembling a plurality of stamped, sheet metal laminations into a riveted assembly to form an electric motor core or the like. The apparatus and method of the present invention constitutes a substantial improvement over the apparatus earlier disclosed in that it provides for the more positive segregation of that number of laminae required for the assembly, in that it provides an improved riveting apparatus for locating, placing and staking the rivets, and in that it provides an improved overall apparatus and method capable of operating at heretofore unattainable speeds in a fully automated manner.

More specifically, the apparatus of the present invention is adapted for utilization with a stamping press having cooperating male and female dies for stamping laminae from which the electric motor stator or the like is to be assembled. Preferably, the stamped laminae are advanced through the female die and into a chute, each stamping operation placing another lamina in the chute and advancing all of the laminae in the chute through a distance equivalent to the thickness of one lamina. Located beyond the chute are the various stacking, segregating, clamping and riveting components of the assembly. The laminae are advanced within the chute telescopically over an interior floating mandrel which engages apertures in the laminae, the mandrel serving to retain the laminae in their proper rotatably oriented positions and also, and perhaps more importantly, serving to support the laminae beyond the end of the chute in position for clamping. Thus, by utilizing the mandrel, that number of laminae necessary to form an assembly is supported beyond the chute in alignment with the chute for subsequent clamping and removal.

The clamping of the laminae is accomplished at their exterior peripheries and the laminae are telescopically removed from the mandrel without disturbing the remainder of the laminae and without disturbing the position of the mandrel. Thus, the clamped laminae are removed longitudinally or axially from the mandrel to a remote assembly station. At this assembly station, the laminae are straddled by a riveting yoke which provides, to one side of the stack, an anvil surface and which provides, to the other side of the stack, a rivet positioned in alignment with rivet apertures formed in the laminae. Next, a rivet or staking head is advanced to displace the rivet through rivet-receiving apertures in the laminae and against the anvil, thus deforming the rivet so as to retain the laminae in firm riveted assembly. The clamping mechanism accommodates displacement of the clamped laminae during this riveting or staking operation to insure the formation of a tight assembly.

The machine is fully automated and utilizes a sequential control system wherein the completion of each operation initiate the following operation. In this manner, the utilization of expensive, inherently slower timer mechanisms is eliminated, and the rapid sequential carrying out of the method is insured. Further, the utilization of limit switches and pressure switches to effectuate the sequential control provides adequate insurance against malfunctions in the overall apparatus.

It is, therefore, an important object of the present invention to provide a new and improved method of and apparatus for forming laminated assemblies.

Another important object of this invention is the provision of an improved apparatus for and method of stacking, segregating and assembling laminae into a laminated article in a fully automated, sequentially controlled process.

It is a further important object of this invention to provide an improved apparatus for stacking and segregating a plurality of laminae by supporting the laminae upon a freely movable or "floating" mandrel for supporting the laminae beyond a supply chute, so that the number of laminae required for an assembly can be readily clamped and segregated for subsequent assembly operations.

Yet another important object of this invention is the provision of a method of making a laminated assembly wherein various stacking, segregating and assembling operations are carried out under the control of a sequential control system and wherein additional, oncoming laminae are stacked for subsequent segregation and assembly during a given assembly operation.

It is a further, and no less important, object of this invention to provide an improved apparatus for the manufacture of laminated riveted assemblies wherein a plurality of laminae are engaged at a stacking station, transferred to an assembly station, interposed between a riveting head and an anvil, and riveted into assembly while the laminae for a next consecutive assembly operation are being accumulated at the segregation station.

Still another important object of this invention is the provision of a novel method of making laminated articles by sequential stacking, segregating and assembling steps and in which each step is performed in sequence in response to the completion of the previous step and in which the steps of stacking and assembling are overlapped so as to insure continuity of operation within the least amount of time.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings, particularly in FIGURES 1 through 8, the apparatus of the present invention may be readily broken down into four components which are described in detail under the following headings, and the overall operation of the apparatus is hereinafter discussed in connection with the electric and hydraulic control circuits.

*Frame and Chute Structure*

Figure 1:
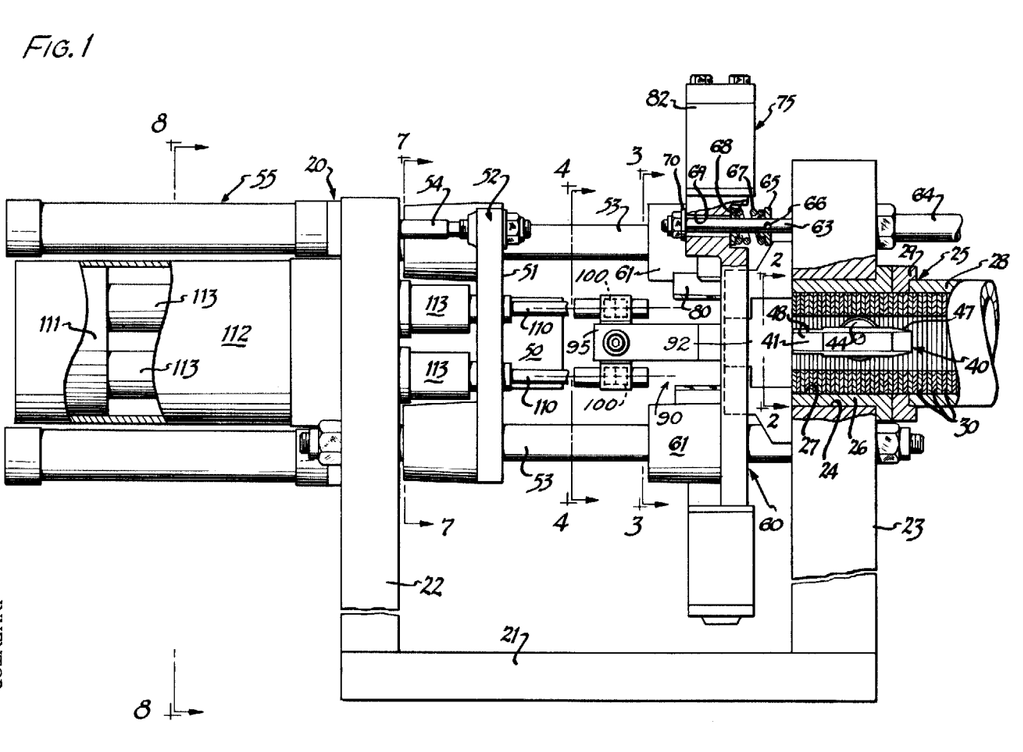
FIGURE 1 is an overall side elevational view, with parts broken away and in section, of the apparatus of the present invention.

As best seen in FIGURE 1 of the drawings, the overall machine 20 includes a frame having a lower longitudinally extending frame element 21 joined to a pair of upstanding arms 22 and 23.

The upstanding arm 23 is provided with a horizontal opening 24 within which is retained a feed chute, indicated generally at 25. More particularly, seated within the opening 24 is a cylindrical feed chute bushing 26 having a generally circular inner bore 27. Of course, the bore 27 is contoured to the part to be supplied and, in this instance, the part being circular, the chute opening 27 is circular. Communicating with the bushing 26 is a chute 28 through which parts 30 are advanced in face-to-face abutment from male and female stamping die components (not shown) located at the remote end of the chute 28. A radially enlarged collar 29 joins the chute 28 and the chute bushing 26.

As explained in my earlier filed application, heretofore referred to, the parts 30 are formed by stamping in a stamping press, the parts being displaced through the female stamping die member into the chute 28 for travel therealong into the apparatus 20. A continuous column of parts 30 thus exists from the chute bushing 26 through the chute 28 to the stamping dies.

Figure 2:
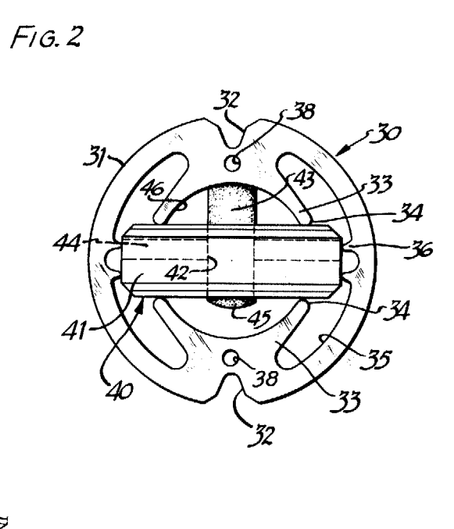
FIGURE 2 is an enlarged fragmentary sectional view taken along the plane 2—2 of FIGURE 1.

As best seen in FIGURE 2, the parts may suitably comprise electric motor stator laminae, such parts 30 having essentially circular outer peripheries 31 provided with radially opposing, inwardly projecting notches 32. To facilitate winding, the parts 30 are provided with arcuate, inwardly projecting arms 33 terminating in rounded extremities 34 which are spaced inwardly from the inner periphery 35 of the part. Additionally, the parts 30 each may be provided with inwardly projecting embossments 36 located intermediate the ends 34 of the arcuate arms 33. Each lamina or part 30 is also provided with a pair of diametrically opposed rivet holes 38.

It will be appreciated that the particular configuration of the part 30 heretofore described in detail forms no part of the present invention. The method and apparatus of the present invention may be utilized with a wide range of parts, the part 30 illustrated in FIGURE 2 merely being representative.

*Mandrel and Pad Structures*

As best illustrated in FIGURES 1 and 2 of the drawings, the parts 30 have central or axial openings, circumscribed by the part arms 33, and positioned in these openings to project axially interiorly of the plurality of parts is a mandrel 40.

The mandrel includes a generally rectangular body 41 of a lateral extent sufficient to fit snugly between the inturned projections 36 of the laminae 30 and of a vertical extent to fit snugly between the ends 34 of the inturned arms 33 of the laminae 30. The body 41 is provided with an internal recess 42 within which is located a roller 43 mounted upon a transverse pin 44 for rotation. The periphery 45 of the roller is crowned slightly for conforming contact with the arcuate inner periphery 46 of the laminae 30, this arcuate inner periphery 46 being defined at the inner edges of the part arms 33. From FIGURE 1, it will be noted that the right-hand or trailing end of the mandrel 40 is tapered, as at 47, while the left-hand or leading end of the mandrel body 41 is reduced in thickness and width, as at 48. For a purpose to be hereinafter more fully described in connection with the operation of the device, the mandrel body 41 is of a length substantially greater than the composite or stacked height of the number of laminae 30 forming a finished article, while the undercut leading end 48 thereof is of an axial extent equal to the composite thickness of that number of parts constituting an assembly.

Due to the fact that the mandrel body 41 fits snugly within the central apertures of the laminae 30, the mandrel 40 bodily advances with the stack of laminae 30 as the laminae are displaced to the left (as viewed in FIGURE 1) as parts are added to the stack by the operation of the press (not shown). The frictional engagement between the roller 44, preferably formed of rubber, and of the body 41 with those portions of the laminae defining the apertures thereof insures co-movement of the mandrel and the stack to the left.

To accurately form the laminae 30 into the stack, some resistance to displacement of the laminae 30 through the chute 28 and the chute bushing 26 is necessary. This resistance is provided by a pressure pad indicated generally at 50 and best illustrated in FIGURES 1 and 9 of the drawings. This pressure pad 50 is generally cylindrical in overall contour and is mounted upon the forward or right-hand face 51 of a cross head 52. This cross head 52 (best seen in FIGURE 7) is mounted upon main guide rods 53 extending between the frame arms 22 and 23, the cross head 52 having secured thereto suitable anti-friction bushings accommodating displacement of the cross head longitudinally of the guide rods 53 toward and away from the chute 28.

The cross head 52 is carried for displacement by piston rods 54 of actuating cylinders 55, the cylinders being mounted upon the frame arm 22 and reacting thereagainst to displace cross head 52 from its position of FIGURE 1 to the right, i.e. toward the chute 28. The pad 50 is of such size as to abut the laminae 30 located at the extreme end of the stack of laminae carried by the chute 28 and the chute bushing 26 and, as will be hereinafter more fully described, the pad 50 also abuts the leading reduced end 48 of the mandrel 40 to displace the mandrel axially within the stack of laminae 30 to the right, i.e. in a direction counter to the direction of advancement of the laminae.

Fluid pressure in the cylinders 55 resists displacement to the left of the cross head 52 and the pressure pad 50 carried thereby, thus providing resistance to movement of the laminae 30 out of the chute. The stack of laminae is forced out of the chute by the stamping press against this resistance.

*Clamping Assembly*

Figure 3:
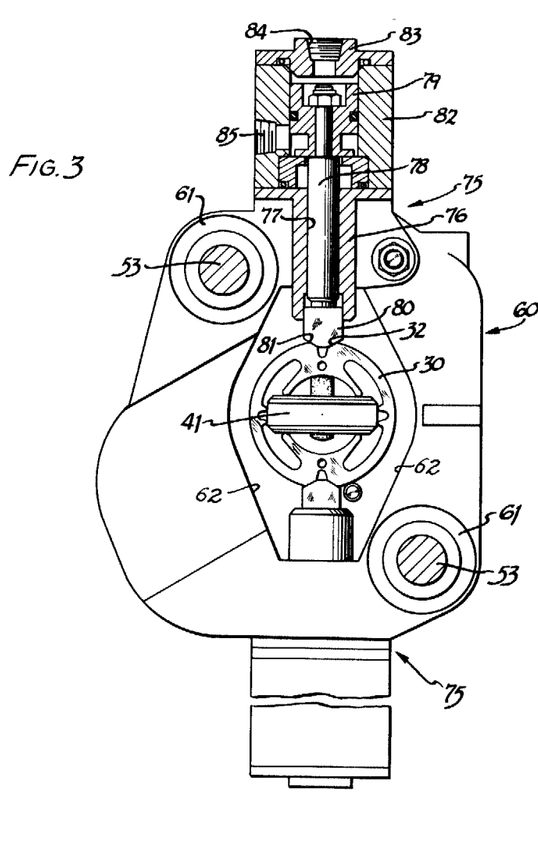
FIGURE 3 is an enlarged sectional view taken along the plane 3—3 of FIGURE 1.

Also carried by the guide rods 53 is a clamping cross head 60 best illustrated in FIGURE 3 of the drawings.

Figures 4, 5, 6:
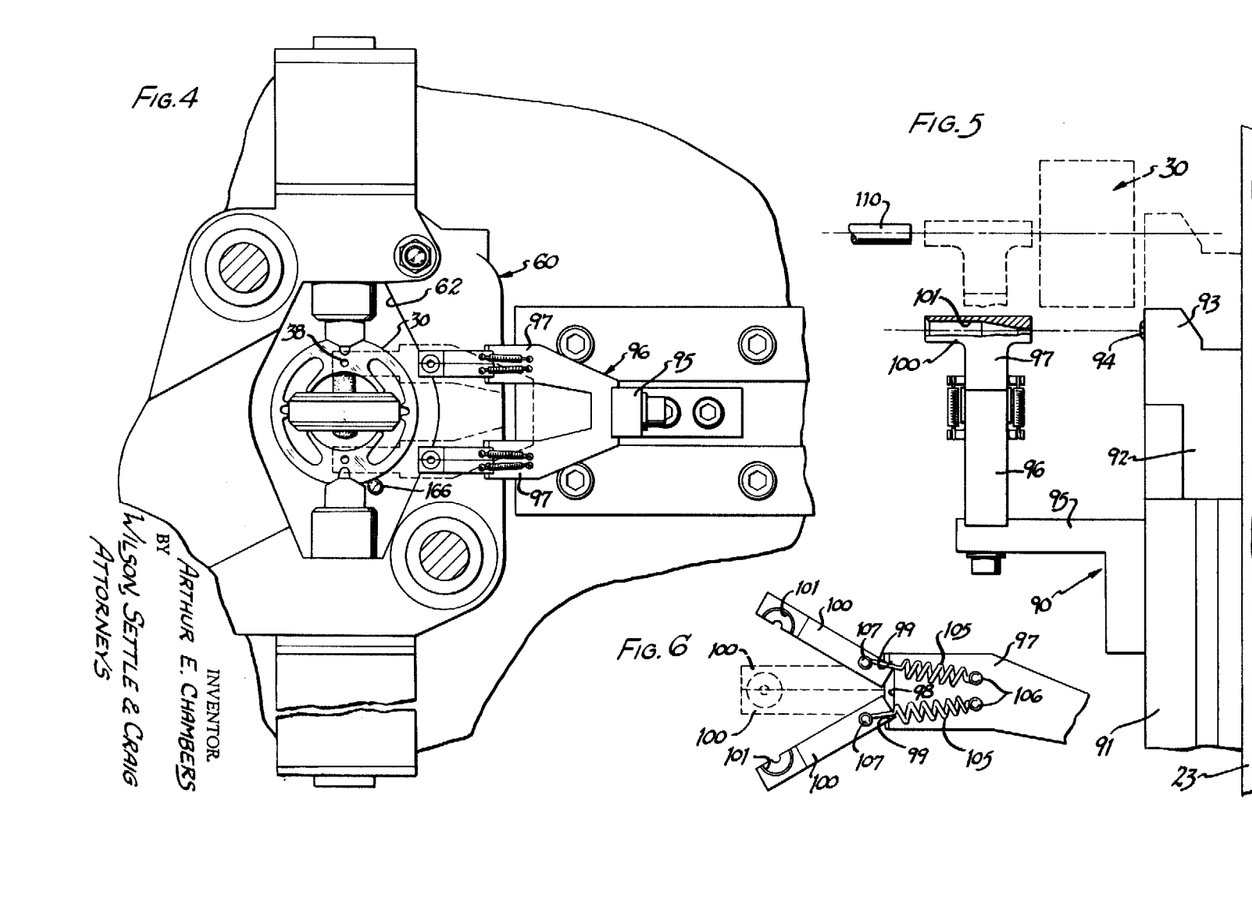
FIGURE 4 is an enlarged sectional view taken along the plane 4—4 of FIGURE 1.
FIGURE 5 is an enlarged, somewhat schematic, view of the rivet carrier and anvil assembly taken at 90° to the view of FIGURE 4.
FIGURE 6 is an enlarged fragmentary elevational view illustrating the rivet holder.

This clamping cross head 60 is generally rectangular in configuration and is provided with forwardly projecting bushings 61 by means of which the cross head 60 is adapted for sliding movement upon the guide rods 53. The cross head 60 is provided with a central aperture 62 through which the pressure pad 50 projects to abut the stack of laminae 30 (FIGURE 4).

The cross head 60 is longitudinally displaceable on the guide rods 53 by means of piston rods 63 of a pair of hydraulic cylinders 64. The piston rods 63 have secured thereto cylindrical washers 65 pinned, as at 66, or otherwise secured to the piston rods 63 for longitudinal displacement therewith. Interposed between the collars 65 and the cross head 60 are compression springs 67 bottomed in recesses 68 formed in the cross head. The piston rods 63 project on through enlarged bores 69 formed in the cross head, the piston rods 63 carrying at their outer extremity enlarged washers or abutments 70 contacting the left-hand faces of the cross head.

Thus, upon actuation of the cylinders 64 to extend the piston rods 63 to the left, motion will be transmitted to the cross head 60 through the piston rod washers 65 and the springs 67 bottomed against the cross head. Limited movement to the right of the cross head relative to the piston rods 63 is accommodated by compression of the spring 67 for a purpose to be hereinafter more fully described. Of course, upon retraction of the cylinder rods 63 to the right, the enlarged piston rod abutment 70 contacting the cross head 60 will displace the cross head to the right.

Carried by the cross head are a pair of oppositely directed clamping assemblies 75. These clamping assemblies 75 are substantially identical except for a difference in size and clamping capacity as will be hereinafter more fully described, so that a description of one such clamping assembly is sufficient for both assemblies.

More specifically, each clamping assembly 75 comprises an elongated guide bushing 76 having an internal bore 77 within which is a reciprocal snugly fitting axially displaceable piston rod 78. Each such rod 78 is actuatable by a piston 79 to displace a clamping member 80 radially of the laminae into contact with the exterior periphery thereof.

It will be recalled from the description of the laminae 30 that each such lamina is provided with a pair of radially opposed notches 32, and the leading end of each of the clamping elements 80 is provided with tapering surfaces 81 matingly engageable in these recesses 82.

The piston 79 is disposed interiorly of a cylinder 82 having a cap 83 provided with an inlet 84 for fluid under pressure. Fluid under pressure entering the inlet 84 will act upon the radially outer, adjacent end of the piston 79 to displace the piston inwardly relative to the chute bushing 26 with the clamping members 80 engaging the laminae 30 positioned between the clamping members. So long as fluid under pressure is maintained in the inlet port 84, the laminae 30 remain clamped by the clamping assemblies 75. To release the clamping assemblies, a fluid pressure inlet opening 85 is provided in the peripheral casing of the cylinder 82 to act upon the inner end of the piston, such pressure acting upon the piston to displace the same radially outwardly and to disengage the laminae 30 previously clamped by the clamping assembly 75.

It will be noted that the piston 79 has quite a short stroke within the cylinder 82, and that the piston bottoms firmly within the cylinder upon the introduction of fluid under pressure through the inlet port 84. Additionally, it will be noted that the two clamping assemblies 75 act in direct opposition relative to one another to engage diametrically opposed portions of the laminae 30. In this manner, the clamping assemblies 75 are always in dynamic balance, one against the other. To further aid in accurately positioning the clamped laminae 30, one of the clamping assemblies 75 (preferably the upper such assembly) has a piston 79 of appreciably larger area than the other piston 79. In this manner, the larger piston will always be bottomed within its cylinder 82 and will provide an accurate means of registry so that the group of laminae 30 are always accurately vertically positioned when clamped.

Additionally, it will be noted from FIGURE 1 that the cross head 60 is located in spaced relation to the free end of the bushing 26. At the time of clamping the laminae 30 for a subsequent assembly operation, the piston rods 63 are retracted and the cross head 60 is bottomed against that portion of the frame arm 23 flush with the end of the bushing 26. The clamping surfaces 81 of the clamping members 80 are of an axial extent sufficient to engage only that number of laminae necessary to form a completed assembly. As will be hereinafter more fully described, the operation of the clamping members 80 thus segregates from the stack of laminae that number of laminae sufficient to form the assembly. Subsequent displacement of the clamping head 60 to the left, by actuation of the cylinders 64, displaces therewith the stack of laminae for the subsequent assembly operation.

*Riveting Assembly*

As best shown in FIGURES 4, 5 and 6, the frame 21, and particularly the frame leg 23 carries a riveting yoke for vertical sliding movement.

This transverse sliding yoke is indicated generally at 90 and is keyed or otherwise secured to the frame element 23 for sliding movement in a plane radial to the laminae 30. The yoke 90 includes a bracket 91 provided at its inner end with an anvil block 92 terminating in an end anvil projection 93 carrying a staking die 94. Preferably, a pair of such staking dies 94 are provided on the anvil block 93 for staking each of the two assembly rivets.

Secured to the slide block 91 is an offset arm 95 carrying at its outer end a bifurcated rivet carrier 96. This rivet carrier 96 comprises a pair of vertically spaced arms 97, each of which is provided with a recess 98 having tapered or chamfered extremities 99.

Seated in each of the recesses 98 are a pair of rivet carriers 100. These rivet carriers being generally rectangular in exterior contour and normally in face-to-face abutment as illustrated in solid outline in FIGURE 4 and in doted outline in FIGURE 6. The rivet carriers 100 are each provided at their outer extremities with semi-circular recesses 101 which are of a longitudinal contour as illustrated in FIGURE 5 of the drawings, the semi-circular recesses 101 cooperating to define an elongated rivet-receiving passage longitudinally aligned with the staking dies 94 of the anvil blocks 93.

From FIGURE 4, it will be noted that the generally Y-shaped yoke is transversely reciprocal between a solid line withdrawn position and a dotted line inserted position at which the rivet passages 101 through the rivet holders 100 are aligned with the rivet apertures 38 of the laminae 30. When in this position, the coiled tension springs 105 hold the rivet holders 100 in their closed positions of FIGURE 4, since the tension springs 105 are connected at their inner ends 106 to the bifurcated arms 97 and at their outer ends to the split rivet holders 100, as at 107. However, the rivet holders 100 are adapted for opening movement as illustrated in solid outline in FIGURE 6, the degree of opening movement being limited by the chamfered surfaces 99 of the recesses 98 contacting the exterior corner surfaces of the rivet holders 100.

At the same time that the rivet holding openings 101 are aligned with the rivet holes 38 of the laminae 30, the anvil blocks 93 move with the yoke 90 into alignment with the apertures 38 so that the staking dies 94 are in position to contact and deform the ends of the rivets displaced through the rivet holders and the rivet apertures 38.

Figure 7:
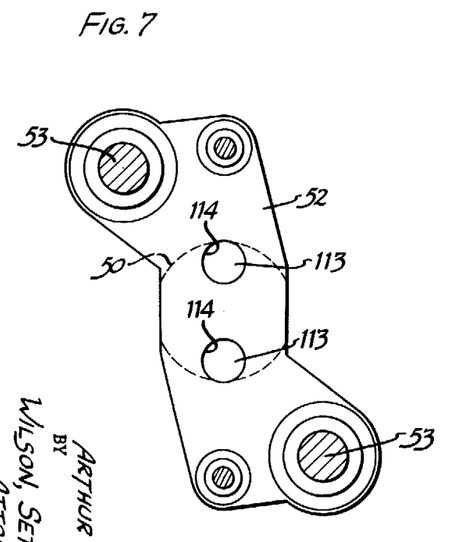
FIGURE 7 is an enlarged fragmentary elevational view taken along the plane 7—7 of FIGURE 1.
Figure 8:
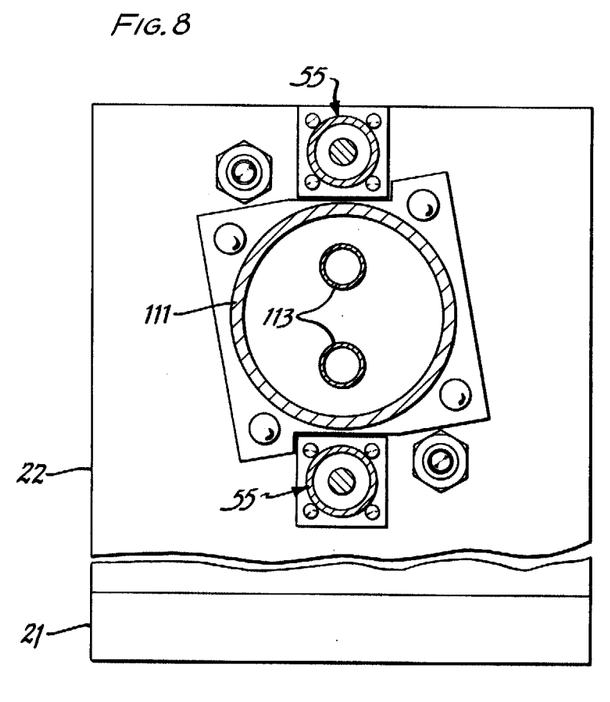
FIGURE 8 is an enlarged fragmentary sectional view taken along the plane 8—8 of FIGURE 1.

The rivets are displaced by staking hammers 110. These staking hammers 110 are carried by a single large piston 111 located interiorly of a fluid pressure actuated cylinder 112, the piston 111 having a pair of rods 113 projecting therefrom and each carrying a hammer 110. As illustrated in FIGURE 7 of the drawings, the rods 113 project through apertures 114 formed in the cross head 52 and in the pressure pad 50 carried thereby.

Upon actuation of the cylinder 112, the piston 111 and the rods 113 are advanced to displace the rivet hammers 110 toward the stacked laminae retained by the clamping assemblies 75, the rivet hammers 110 entering and passing through the apertures 101 of the rivet holders 100, spreading the rivet holders 100 toward their solid line positions illustrated in FIGURE 6 of the drawings and displacing the rivets through the assembled stack and against the staking dies 94. The springs 67 on the clamping carriage 60 accommodate slight displacement of the clamped laminae against the anvil 93 to insure adequate and tight staking of the rivets to firmly join the assembly.

Rivets are supplied to the rivet heads 100 by suitable means, as by the means illustrated in my above-identified application, when the riveting yoke 90 is retracted to its solid line position of FIGURES 4 and 5 of the drawings.

*Electric and Hydraulic Control Circuits and Operation*

Figure 15:
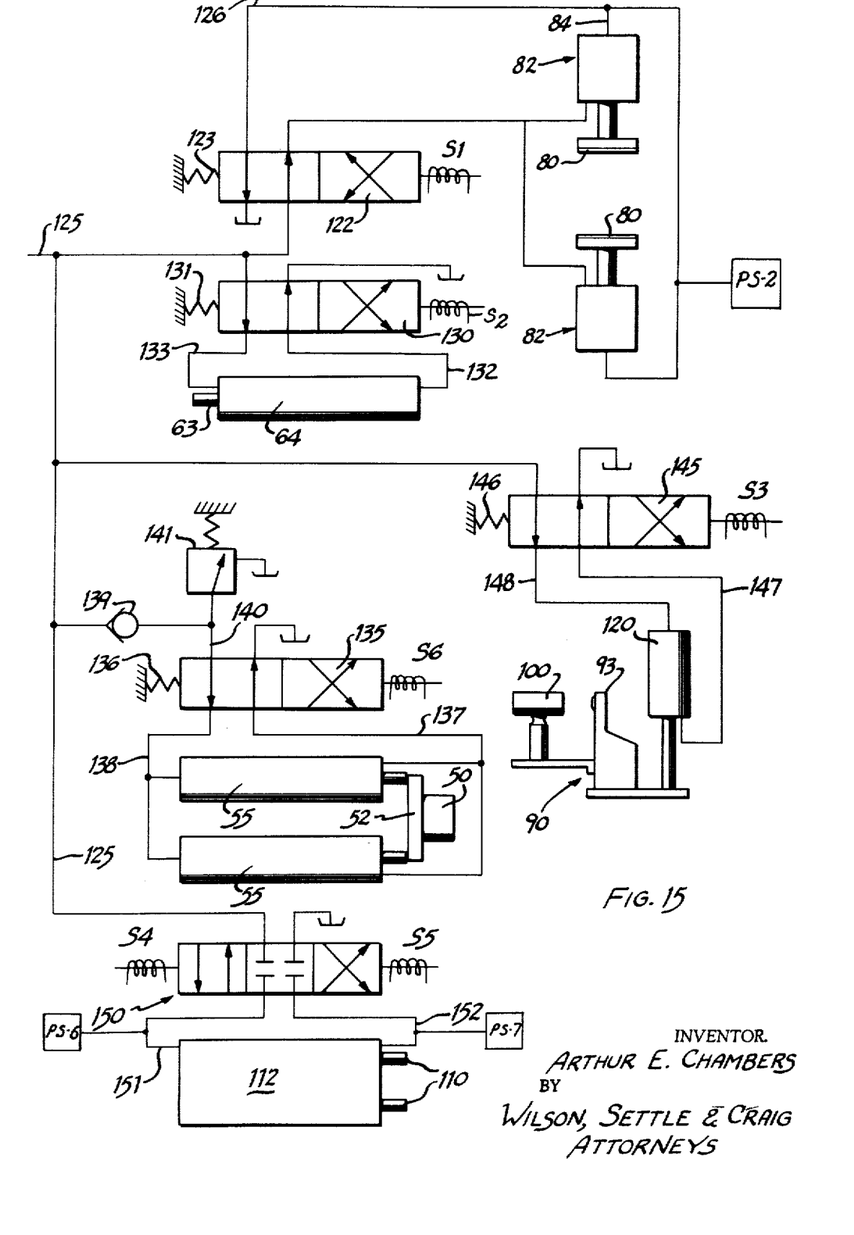
FIGURE 15 is a diagrammatic representation of the hydraulic control circuit for the apparatus.
Figure 16:
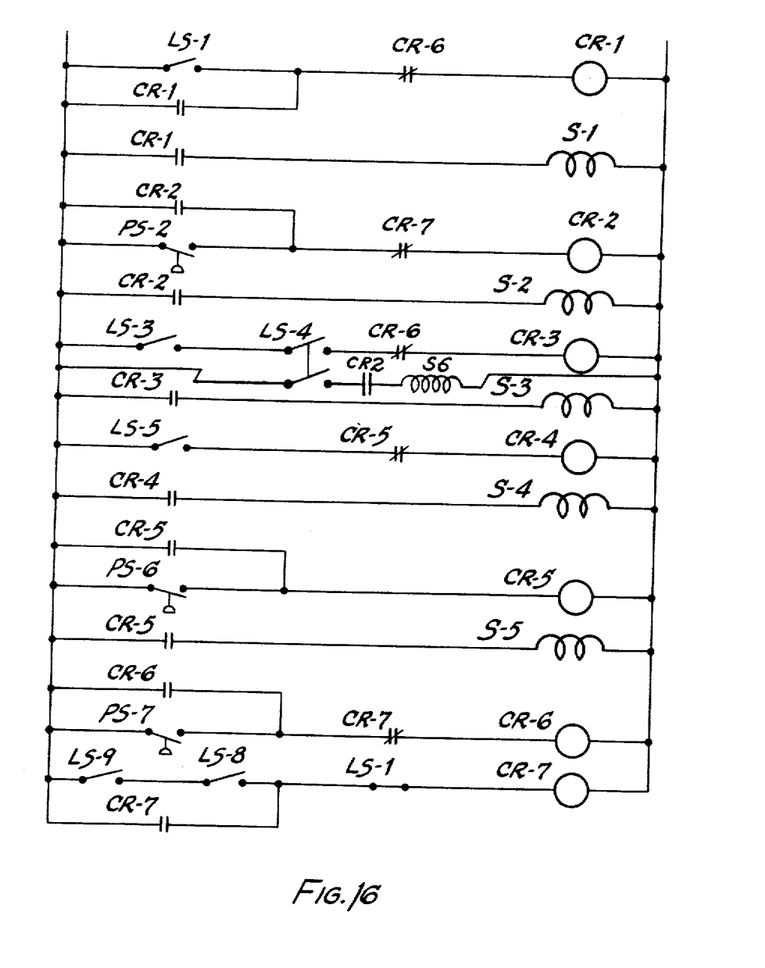
FIGURE 16 is a diagrammatic representation of the electrical control system.

Turning now to FIGURES 15 and 16, the hydraulic and electric control circuits, respectively, illustrated therein, can best be understood in conjunction with the operation of the overall device as illustrated in FIGURES 9 through 14. Accordingly, an initial reference to FIGURE 9 of the drawings is in order.

Figure 9:
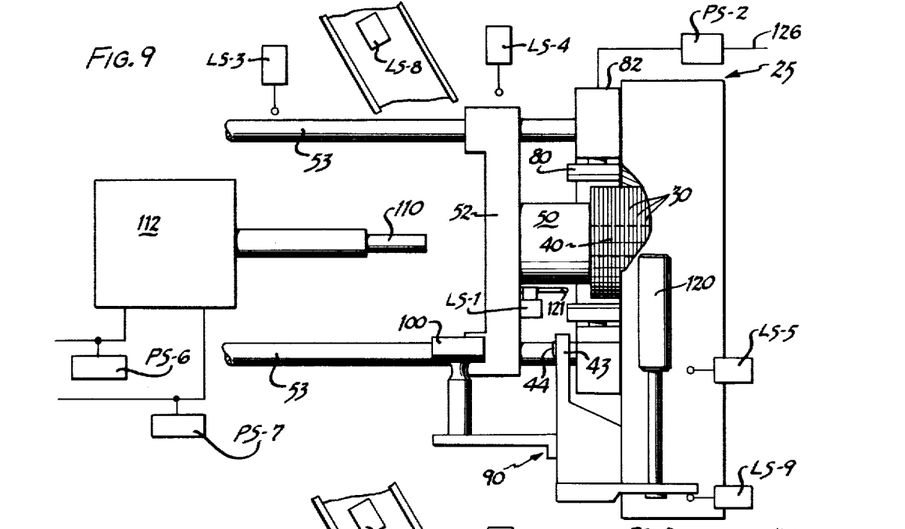
FIGURES 9 through 14 are somewhat schematic elevational views illustrating the operation of the apparatus in carrying out the method of the present invention.

From FIGURE 9 of the drawings, it will be appreciated that the apparatus is shown in an initial starting position in which a plurality of laminae 30 are stacked up within the chute 25, some of the laminae being supported internally by the mandrel 40 beyond the forward extremity of the chute as the laminae 30 are advanced against the resistance of the pressure pad 50.

Positioned adjacent the chute forward end and in spaced relation thereto is a limit switch LS1 having its actuating rod 121 positioned a distance from the forward face of the chute equivalent to the space occupied by the desired number of laminae to form a complete assembly. Thus, when the desired number of laminae project beyond the forward end of the chute, limit switch LS1 is actuated, as illustrated in FIGURE 10 of the drawings.

Referring now to FIGURE 16 of the drawings, it will be seen that actuation of the limit switch LS1 energizes circuit relay CR1 (assuming that the relay CR6 is not energized). Energization of the relay CR1 will, by its contacts, energize solenoid S1. From FIGURE 15 of the drawings, it will be seen that energization of the solenoid S1 will replace to the left a four-way valve body 122 against the bias of spring 123. Such displacement of the valve body 122 will interconnect a fluid pressure supply line 125 with a fluid conduit 126 leading to the outer ports 84 of the clamping cylinders 82. Concurrently, the inner ends of the cylinder 82 are connected to drain by the conduit 127 and valve body 122.

Figure 10:
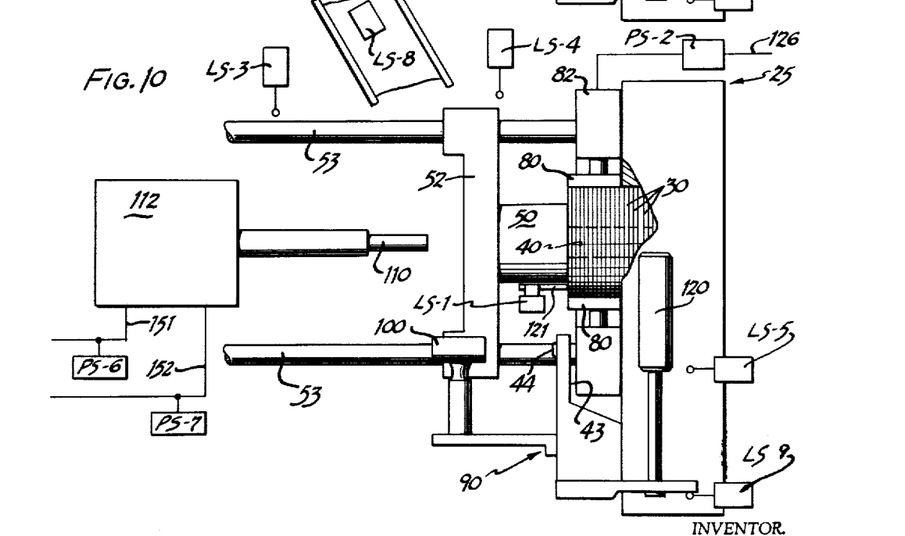

Thus, the clamping cylinders 82 are energized in response to the stacking of a number of laminae sufficient to form an assembly, the cylinders 82, when energized, engaging the clamping elements 80 in the notches 32 of the laminae 30, as illustrated in FIGURES 3 and 10 of the drawings. The clamping elements 82 are of such axial extent that the number of laminae engaged by the clamping cylinders is that number necessary to actuate the limit switch LS1 and corresponding to that number of laminae necessary to form a final laminated assembly. Actuation of the cylinders will centralize the engaged laminae vertically between the cylinders (by virtue of the oversized upper cylinder 79) and the slight resultant radially inward distortion of the laminae (by virtue of their clamping engagement) will be accommodated by the undercut end surfaces 48 of the mandrel 40. Any laminae not in the undercut surfaces 48 will be distorted into binding engagement with the mandrel. Thus, the necessary number of laminae to form the final assembly have been stacked and clamped.

Next, the pressure switch PS2 is energized by virtue of the pressure within the conduit 126 for the cylinders 82, this pressure increasing to a value necessary to actuate pressure switch PS2 after the clamping cylinders are effective to fully clamp the laminae 30. The energization of pressure switch PS2 will (assuming that relay CR7 is not actuated) actuate the relay CR2. This relay CR2 will energize solenoids S6 and S2.

Energization of the solenoid S2 will, by reference to FIGURE 15, displace a valve body 130 to the left against the bias of a compression spring 131 to interconnect fluid pressure supply line 125 with the rear or blind end of the cylinder 64 by conduit 132, the forward or piston end of the cylinder 64 being vented to drain through conduit 133. At this time, the clamping carriage 60 is shifted to the left on the guide rods 53 by extension of the piston rods 63, as best illustrated in FIGURE 1 of the drawings.

Figure 11:
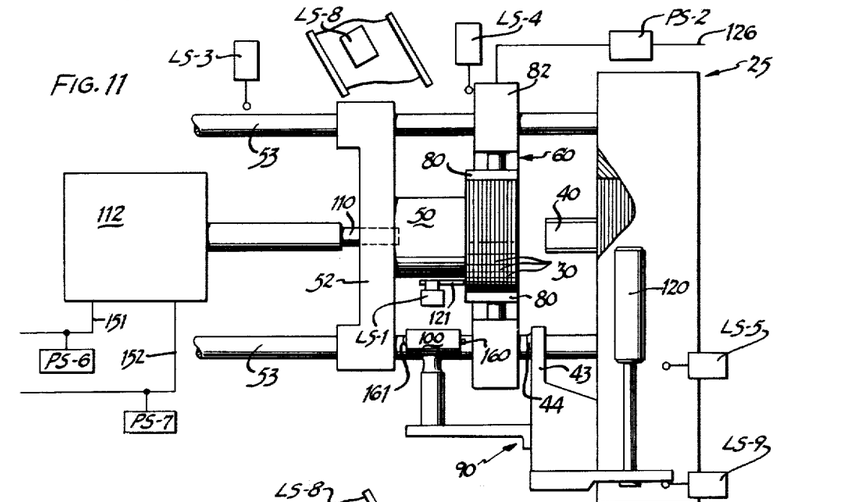

The clamped laminae 30, the clamping cylinders 82 and the clamping carriage 60 are thus shifted to the left to the assembly position of FIGURE 11 of the drawings to actuate limit switch LS4 interposed in the path of movement of the carriage 60.

Energization of the solenoid S6 will shift the valve body 135 to the left against the compression spring 136, thereby connecting the forward or piston rod ends of the pressure pad carriage cylinders 55 to fluid under pressure through line 125 by a conduit 137 and connecting the rear or blind ends of the cylinders 55 to sump through conduit 138. It will be recalled that the pressure pad 50 provides a resistance against which the stacks of laminae are built up, such resistance being provided by fluid under pressure from the source line 125 and through check valve 139 and conduit 140 when the valve body 136 is positioned in its right-hand position as illustrated in FIGURE 16 of the drawings. A pressure relief valve 141 of conventional type is disposed within the line 140 to limit the pressure applied to the pressure pad carriage 52 by the cylinders 55 to that desired value against which the stack build-up occurs.

Figure 12:
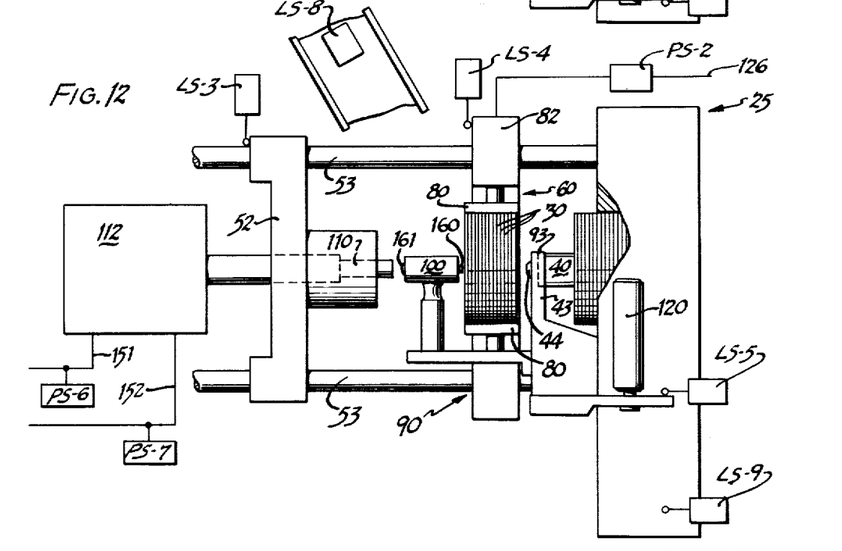

Thus, by actuation of the solenoid S6, the pressure pad carriage 52 and the pressure pad 50 are retracted to the left to their position illustrated in FIGURE 12 of the drawings.

When the position of FIGURE 12 is attained, limit switch LS3 is actuated by the pressure pad carriage. When limit switches LS3 and LS4 (responsive to clamping carriage movement) have been simultaneously actuated, and assuming that circuit relay 6 remains closed, relay CR3 is energized to in turn energize solenoid S3.

From FIGURE 15 of the drawings, it will be seen that energization of the solenoid S3 will shift the valve body 145 to the left against the compression spring 146, so that fluid under pressure from the conduit 125 can flow through the conduit 147 into the anvil and rivet carrier yoke cylinder 120. The conduit 147 leads to the piston end of the cylinder 120 to retract the piston therein, the piston thus displacing the yoke 90 inwardly so that the anvils 93 and the rivet carriers 100 are disposed to either side of the clamped stack of laminae 30 in longitudinal alignment with the rivet apertures 38 in each of the laminae. The yoke 90 thus straddles the clamped stack of laminae 30 and the clamping carriage. Of course, the rivets carried by the rivet head 100 are similarly aligned with the rivet apertures 38 of the laminae and the apparatus is now positioned for the riveting and staking operation.

Displacement of the anvil and rivet yoke 90 to the position of FIGURE 12 actuates limit switch LS5. From FIGURE 16, it will be seen that actuation of limit switch LS5 will energize relay CR4 which, in turn, energizes solenoid S4. This solenoid S4 actuates a valve body 150 to the right to advance the rivet hammers 110 for the riveting and staking operation.

It will be noted that the valve body 150 is a six-way valve having a central or neutral position to which the valve is urged by neutralizing springs (not shown) when neither the solenoid S4 nor the solenoid S5 is energized. Energization of the solenoid S4 displaces the valve body to the right from this neutral position to introduce fluid under pressure from the supply line 125 through conduit 151 into the rear or blind end of the cylinder 112. The consequent displacement of the large piston 111 forces the staking hammers 110 through the stationary, retracted pressure pad 50 and through the rivet holders 100 to move the split rivet holders 100 to their solid line positions of FIGURE 6 and to displace the rivets retained thereby through the apertures 38 of the laminae 30, the forward ends of the rivets striking the anvil staking dies 94 to splay or stake the rivets to their final positions.

The rivets 160 (FIGURE 13) have enlarged heads 161 which engage the leading lamina 30 (the lamina furthest to the left) and displace the stack of laminae to the right against the bias of the compression springs 67. The compression springs 67 accommodate the concurrent displacement to the right of the clamping head 50 while the clamping cylinders 82 remain fully energized and the clamping members 80 remain in full contact with the laminae.

Figure 13:
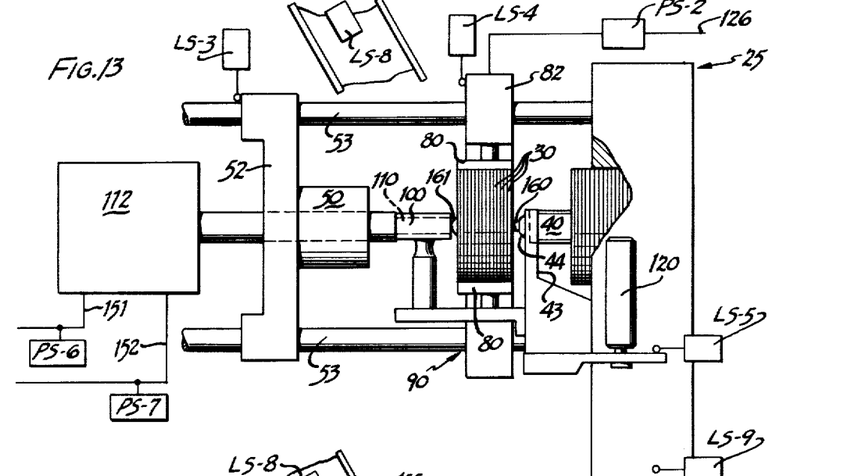
Figure 14:
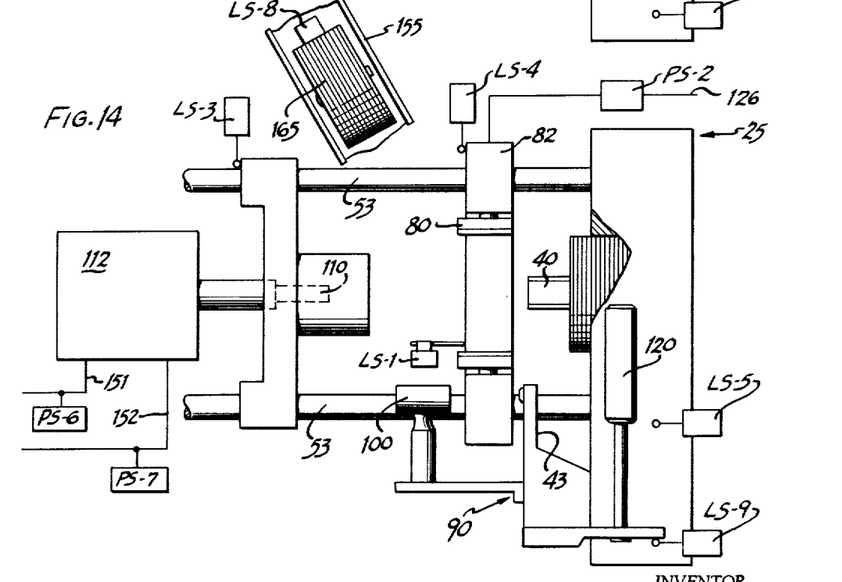

Thus, full and accurate staking of the rivets against the staking dies 94 is accommodated and a tight assembly is insured while making possible the necessary transverse movement clearance between the anvil die buttons 94 and the clamped laminae 30 during transverse movement of the anvil and rivet holder head 90 to its dotted position of FIGURE 5 and its illustrated positions of FIGURES 12 and 13.

When the rivet hammers 110 have completed their riveting stroke, the pressure within line 151 reaches a maximum value and actuates pressure switch PS6 to energize relay CR5 and solenoid S5. The solenoid S5 displaces the six-way valve body 150 to the left and, at the same time, de-energizes solenoid S4 to accommodate such movement of the valve body 150. The resultant fluid under pressure introduced into the rod side of the cylinder 112 through fluid pressure line 152 will return the rivet hammers 110 to their retracted positions.

Once the piston 113 bottoms within the cylinder 112, pressure switch PS7 is energized, assuming that relay CR7 is not energized and relay CR6 is effective to de-energize the solenoid S1 of the clamp cylinders 82, so that the spring 123 will return the valve body 122 to its illustrated right-hand position and the clamp cylinders will be released by fluid pressure introduced through the conduits 127. At the same time, the anvil and rivet carrier head 90 is retracted to its position of FIGURE 14 by de-energization of the solenoid S6, so that the spring 146 can return the valve body 145 to its illustrated right-hand position with fluid pressure being introduced through the line 148 into the blind end of the cylinder 120. Both of these operations are accomplished by closure of the contact of the relay CR6.

The return of the head 90 actuates limit swtich LS9. At substantially the same time the limit switch LS8 in the exit trough 155 for the assembled part is actuated by the part falling through the trough 155, as the assembly 165 is released from the clamping head 60, the assembly 165 being directed into the trough by a blocker rod 166 carried by the clamping head 60 (FIGURE 4). The concurrent actuation of limit switches LS8 and LS9 energizes the relay CR7, so long as the limit switch LS1 is maintained in its normally closed position. The relay CR7 de-energizes the solenoid S2 and the relay CR6, so as to reposition the mechanism for the next subsequent operation. The next subsequent operation is initiated by actuation of the limit switch LS1 to indicate the presence of a sufficient number of laminae 30 to form the next riveted assembly.

Further, it will be noted that the solenoid S6 is de-energized at the same time as the solenoid S2 is de-energized, so that the valve body 135 is shifted to its illustrated right-hand position of FIGURE 16 to thereby actuate the pressure pad carriage cylinders 55 to move the pressure pad 50 and its carriage 52 to the right into contact with the terminal laminae, so that the pressure pad can provide resistance to the subsequent stacking up laminae for the next assembly operation. This movement of the pressure pad 50 engages the leading face of the pad with the leading face of the mandrel 40 to displace the mandrel axially inwardly of the stack of laminae 30.

I claim:

1. In a method of making a laminated assembly from a plurality of laminated parts, the steps of advancing the parts in sequence through a chute toward a chute opening, the parts being telescoped over a central mandrel frictionally engaging the parts, supporting beyond the chute opening by engagement with the mandrel that number of parts required for an assembly, engaging spaced peripheral portions of the parts exteriorly of the chute opening, moving the parts so engaged telescopically over the mandrel to a remote assembly position while retaining the mandrel in fixed position by its frictional engagement with those parts still in the chute, and securing the clamped parts into assembly.

2. In an apparatus for riveting a plurality of laminated parts into assembly, the parts each having a central aperture, means for accumulating and segregating a number of parts sufficient for the assembly comprising a chute in which the parts are aligned in face-to-face abutment with one another, a floating mandrel located interiorly of the parts and frictionally engageable with a number of parts greater than the number of parts required for a single assembly, the parts advancing through the chute with the mandrel engaging parts in the chute while supporting beyond the end of the chute the required number of parts for an assembly, clamping means engageable with said required number of parts while supported on said mandrel and means for moving the clamping means and the parts engaged thereby to a location remote from the chute, movement of said means telescopically removing the parts from engagement with the mandrel.

3. In a method of securing a plurality of laminated parts into assembly, the parts having aligned central apertures, the steps of advancing the parts in face-to-face abutment through a chute with the part apertures in alignment, frictionally engaging on a mandrel a number of parts in excess of that required to form an assembly, supporting by the mandrel exteriorly of the chute that number of parts required to form an assembly, engaging spaced exterior portions of that number of parts required to form an assembly while said parts are supported on said mandrel, and shifting the clamped parts relative to the chute to separate from the mandrel only the clamped parts.

4. In a method of making a laminated assembly consisting of a plurality of identical laminae, the steps of supporting on a central mandrel a plurality of laminae in excess of the number of laminae required to form an assembly, engaging and removing from the mandrel only that number of laminae required for an assembly, straddling the removed laminae with an anvil and a rivet carrier, displacing a rivet from the carrier through the laminae and into engagement with the anvil, and releasing the riveted assembly.

5. In an apparatus for securing a plurality of laminated parts into assembly, the parts each having a central aperture and additional rivet-receiving apertures, means for clamping the parts in face-to-face abutment, a U-shaped rivet carriage having legs straddling the clamped parts, and spaced through a distance greater than the thickness of the clamped parts, one leg of the U having a staking die alignable with the rivet-receiving apertures of the parts and the other leg of the U carrying rivets alignable with the rivet-receiving apertures of the parts, a power-actuated rivet head displaceable longitudinally with respect to the parts to displace a rivet held by said other leg of said carriage through the clamped parts and into engagement with the staking die on said one leg of said carriage to secure said parts into assembly, power means for actuating said rivet head, and means accommodating movement of the clamping means relative to the rivet head to insure rivet-to-die contact and the formation of a tight assembly.

6. In an apparatus for securing a plurality of laminated parts into assembly, the parts each having a central aperture, a chute in which the parts are aligned in face-to-face abutment with one another, a floating mandrel located interiorly of the parts and frictionally engageable with a number of parts greater than the number of parts required for a single assembly, the parts advancing through the chute with the mandrel supporting beyond the end of the chute the required number of parts for an assembly, clamping means engageable with said required number of parts, means for shifting the clamping means and the parts engaged thereby to a location remote from the chute, and means for riveting said parts into assembly.

7. In an apparatus for securing a plurality of apertured laminated parts into assembly, a chute through which parts are advanced in face-to-face abutment and with their apertures in alignment, a mandrel projecting through the aligned parts apertures and frictionally engaging the parts to support the number of parts required for an assembly beyond the end of the chute, a clamping carriage located exteriorly of the chute and having clamping members engageable with that number of parts projecting beyond the end of the chute, and means for actuating the clamping carriage for movement from a first position adjacent the end of the chute at which the clamping members are engageable with parts supported centrally by the mandrel to a second position remote from the chute at which subsequent assembly operations are carried out.

8. In a method of making a laminated assembly from a predetermined number of identical parts having aligned central apertures, the steps of telescoping over a mandrel a number of parts in excess of that required to form an assembly, the parts frictionally engaging the mandrel, engaging spaced exterior portions of only that number of parts required to form an assembly while said parts are engaged by said mandrel, and shifting axially of the mandrel only the clamped parts while continuing to support the remainder of the parts on the mandrel.

9. In a method of making an assembly of a plurality of identical stamped laminae, the steps of advancing a column of laminae in face-to-face abutment, segregating from the forward end of the column a predetermined number of laminae, transferring the segregated laminae to an assembly station, interposing the laminae between an anvil and a rivet carrier, displacing a rivet from the carrier through the laminae and into engagement with the anvil and releasing the riveted assembly.

10. In an apparatus for securing into assembly a plurality of stamped parts from a stamping press, the parts each having a central aperture, means for segregating and transferring to an assembly station that number of parts required for an assembly comprising a chute through which the stamped parts are advanced from the press in face-to-face engagement and with the part apertures in registry, a mandrel located centrally of the parts and on which the parts are frictionally engaged, the number of parts on the mandrel being in excess of that required for an assembly, part-engaging clamping means located at the chute exit end to engage only the number of parts required for an assembly as the parts are retained by the mandrel, the engagement of the mandrel with parts in the chute supporting the mandrel in cantilever fashion beyond the chute and that portion of the mandrel projecting beyond the end of the chute supporting additional parts, means actuating the clamping means into engagement with the parts on the mandrel for movement to an assembly station remote from the end of the chute, while the mandrel remains frictionally engaged with parts in the chute, and means subsequently displacing the mandrel back into the chute.

11. In an apparatus for securing a plurality of laminated parts having apertures into an assembly, a chute through which parts are advanced in face-to-face abutment and with their apertures in alignment, means supporting the number of parts required for an assembly beyond the end of the chute, a clamping carriage located exteriorly of the chute and having actuatable clamping members engageable with parts located beyond the end of the chute, means responsive to the presence of said number of parts beyond the end of the chute to actuate said clamping means, means for actuating the clamping carriage for movement from a first position adjacent the end of the chute at which the clamping members are engageable with parts supported centrally by the mandrel to a second position remote from the chute at which subsequent assembly operations are carried out, and means responsive to actuation of said clamping means for actuating said clamping carriage.

12. In a method of assembling a plurality of parts, the parts being identical and having aligned central apertures, the steps of advancing the parts in face-to-face abutment through a chute with the part apertures in alignment, disposing the parts on a mandrel projecting through the parts apertures and frictionally engageable with a number of parts in excess of that required to form an assembly, supporting by the mandrel exteriorly of the chute that number of parts required to form an assembly, engaging spaced exterior portions of only that number of mandrel-supported parts required to form an assembly, and moving the clamped parts from the mandrel to an assembly station.

13. In an apparatus for securing into assembly a plurality of laminated parts, the parts each having a central aperture, means for stacking and separating a required number of parts for subsequent assembly comprising a chute through which the parts are advanced in face-to-face engagement with the part apertures in registry, a floating mandrel located centrally of the parts and frictionally engaging the parts at their portions defining the apertures thereof, the mandrel being in frictional engagement with a number of parts in excess of that required for an assembly, the engagement of the mandrel with parts in the chute supporting the mandrel in cantilever fashion beyond the chute and that portion of the mandrel projecting beyond the end of the chute supporting the number of parts required for an assembly, a pair of fluid pressure actuated clamping cylinders located adjacent the chute in opposed relation to one another, part-engaging clamping elements actuated by said cylinders to engage the number of parts required for an assembly as the parts are retained by the mandrel, means supporting the clamping members for movement to an assembly station remote from the end of the chute, and means responsive to the presence beyond the end of the chute of at least the number of parts required for an assembly to actuate said clamping cylinders.

14. In an apparatus for securing a plurality of laminated parts into assembly, the parts each having a central aperture and additional rivet-receiving apertures, means for clamping the parts for assembly and including clamping elements engaging opposed peripheral portions of the parts, a U-shaped rivet carriage having legs straddling the clamped parts, one leg of the carriage having anvil surfaces alignable with the rivet-receiving apertures of the parts and the other leg of the U carrying rivets alignable with the rivet-receiving apertures of the parts, a power actuated rivet head displaceable longitudinally with respect to the parts to displace a rivet held by said other leg of said carriage through the parts and into engagement with the anvil surface on said one leg of said carriage to secure said parts into assembly, and power means for actuating said rivet head.

15. In a method of making a laminated assembly from a plurality of identical centrally apertured parts, the steps of advancing the parts in sequence through a chute toward a chute opening, the parts being telescoped over a central mandrel frictionally engaging the parts, supporting beyond the chute opening and solely by engagement with the mandrel that number of parts required for an assembly, engaging peripheral portions of the parts exteriorly of the chute opening, moving the engaged parts telescopically over the mandrel and in a direction away from the chute opening to a remote assembly position while retaining the mandrel in fixed position by its frictional engagement with those parts still in the chute, securing the clamped parts into assembly, and subsequently displacing the mandrel toward the chute and into additional parts therein to support said additional parts for subsequent clamping and separation.

16. In an apparatus for riveting into assembly a plurality of stamped parts each having an aperture from a stamping press, a chute through which parts are advanced by the press, the parts being in face-to-face abutment and with their apertures in alignment, a mandrel projecting through the aligned parts apertures and frictionally engaging the parts to support the number of parts required for an assembly beyond the end of the chute, a clamping carriage located exteriorly of the chute and having clamping members engageable with that number of parts projecting beyond the end of the chute, means for actuating the clamping carriage for movement from a first position adjacent the end of the chute at which the clamping members are engageable with parts supported centrally by the mandrel to a second position remote from the chute, a riveting yoke having spaced rivet-retaining means and rivet-staking means straddling the clamped parts at said second position, and rivet hammer means displaceable relative to the yoke to rivet the clamped parts into assembly.

17. In an apparatus for stacking, segregating and securing a plurality of laminae into an assembly, the laminae each having a central aperture, means for stacking and segregating the number of laminae required for an assembly comprising a chute through which the laminae are advanced in face-to-face engagement with their apertures in registry, an elongated floating mandrel frictionally engaging the laminae to be advanced therewith through and beyond the chute, the mandrel being in frictional engagement with and projecting through the apertures of a number of laminae in excess of that required for an assembly, a pressure pad engaging the leading lamina and providing a resistance against which the laminae are advanced in and beyond the chute, the engagement of the mandrel with laminae in the chute supporting the mandrel in cantilever fashion beyond the chute and that portion of the mandrel projecting beyond the end of the chute supporting the number of laminae required for an assembly, laminae-engaging means located exteriorly of the chute for engaging those laminae on the mandrel portion projecting beyond the chute, and means supporting the engaging means and the laminae supported thereby for movement to an assembly station remote from the end of the chute, the mandrel remaining frictionally engaged with laminae in the chute.

18. In an apparatus for securing a plurality of stamped parts into assembly, the parts each having a central aperture, a chute through which the parts are advanced after stamping in face-to-face abutment with one another and with the parts apertures in registry, a floating mandrel projecting through the registering apertures of the parts and frictionally engageable with a number of parts greater than the number of parts required for a single assembly, the parts and the mandrel advancing through the chute and therebeyond until the mandrel supports beyond the end of the chute that number of parts required for an assembly, clamping means exterior to the chute and engageable with said required number of parts, means for shifting the clamping means and the parts engaged thereby to a location remote from the chute, shifting of the clamping means removing the parts from the mandrel, and means engageable with the mandrel to displace the mandrel through the registering apertures of oncoming parts to support said oncoming parts for subsequent clamping and removal.

19. In an apparatus for riveting into an assembly a plurality of laminated parts each having an aperture, a chute through which parts are advanced in face-to-face abutment and with their apertures in alignment, means frictionally engaging the parts to support beyond the end of the chute the number of parts required for an assembly, a clamping carrier located exteriorly of the chute and having clamping members engageable with that number of parts projecting beyond the end of the chute, means for actuating the clamping carriage for movement from a first position adjacent the end of the chute at which the clamping members are engageable with parts supported centrally by the mandrel to a second position remote from the chute, and riveting means at said second position.

20. In a method of securing a plurality of parts into assembly, the parts being formed by stamping in a press to identical shapes and having aligned central apertures, the steps of advancing the parts by the press in face-to-face abutment through a chute with the part apertures in alignment, the parts being advanced against the resistance of a pressure pad contacting the leading part, a number of the parts in excess of that required to form an assembly being in frictional engagement with a mandrel abutting the pressure pad, the continued advancement of the parts by the press disposing exteriorly of the chute to be supported solely by the mandrel that number of parts required to form an assembly, engaging said parts required to form an assembly while said parts are supported on said mandrel, shifting the clamped parts relative to the chute to separate only the clamped parts from the mandrel, and subsequently displacing the mandrel through the remaining mandrel-engaging parts by the pressure pad.

21. In a method of making a laminated assembly by riveting together a plurality of identical laminae, the steps of accumulating a plurality of laminae, securing the laminae in face-to-face abutment, transferring the secured abutting laminae to an assembly station, straddling the laminae with a riveting yoke having an anvil surface and a rivet carrier disposed on opposite sides thereof, displacing a rivet from the carrier through the laminae and into engagement with the anvil surface and releasing the riveted assembly.

22. In an apparatus for securing a plurality of laminated parts into assembly, the parts each having a central aperture, and the apparatus including spaced stacking and assembly stations, a chute at the stacking station in which the parts are aligned in face-to-face abutment with one another, a mandrel located interiorly of the parts and having a first portion in said chute frictionally engageable with parts therein, the mandrel having a second reduced portion projecting beyond the end of the chute to support thereon the required number of parts for an assembly, clamping means engageable with said required number of parts supported on the mandrel second portion and means for moving the clamping means and the parts engaged thereby relative to the mandrel and to the assembly station.

23. In a method of making a laminated assembly consisting of a plurality of identical laminae, the steps of clamping in abutment a plurality of laminae, transferring the abutting laminae to an assembly station, interposing the laminae between an anvil and a rivet carrier, displacing a rivet from the carrier through the laminae and into engagement with the anvil, and releasing the riveted assembly.

24. In an apparatus for securing into assembly a plurality of laminated parts, the parts each having a central aperture, means for segregating and engaging a required number of parts for an assembly comprising a chute through which the parts are advanced in face-to-face engagement with the part apertures in registry, a floating mandrel located centrally of the parts and frictionally engaging the parts at their portions defining the apertures thereof, the mandrel being in frictional engagement with a number of parts in excess of that required for an assembly, a pressure pad engaging the leading part and providing a resistance against which the parts are advanced, a pair of clamping cylinders located adjacent the chute in opposed relation to one another, part-engaging clamping elements actuated by said cylinders to engage the number of parts required for an assembly as the parts are retained by the mandrel, the engagement of the mandrel with parts in the chute supporting the mandrel in cantilever fashion beyond the chute and that portion of the mandrel projecting beyond the end of the chute supporting the number of parts required for an assembly, actuation of the cylinders engaging the clamping means with the number of parts required for an assembly, and means supporting the clamping members for movement to an assembly station remote from the end of the chute, the mandrel remaining frictionally engaged with parts in the chute.

No references cited.

UNITED STATES PATENT OFFICE
CERTIFICATE OF CORRECTION

Patent No. 3,109,550                            November 5, 1963

Arthur E. Chambers

It is hereby certified that error appears in the above numbered patent requiring correction and that the said Letters Patent should read as corrected below.

Column 14, line 11, for "carrier" read -- carriage --.

Signed and sealed this 14th day of April 1964.

(SEAL)
Attest:
ERNEST W. SWIDER

Attesting Officer

EDWARD J. BRENNER

Commissioner of Patents